United States Patent [19]

Palfery et al.

[11] Patent Number: 4,555,844
[45] Date of Patent: Dec. 3, 1985

[54] PART TURNOVER ATTACHMENT FOR AUTOMATIC MACHINE TOOL

[75] Inventors: Kenneth J. Palfery, Toronto; John S. Malcolm, Schomberg; Kenrick B. Maharaj, Brampton, all of Canada

[73] Assignee: McDonnell Douglas Corporation, Long Beach, Calif.

[21] Appl. No.: 681,906

[22] Filed: Dec. 14, 1984

[51] Int. Cl.⁴ .......................................... B23Q 3/157
[52] U.S. Cl. ...................................... 29/568; 414/758; 901/41
[58] Field of Search .............. 29/568, 563, 561, 26 A, 29/26 R; 414/758, 763, 783, 729, 738; 901/6, 41; 408/71, 69; 409/219, 225

[56] References Cited

U.S. PATENT DOCUMENTS

| | | | |
|---|---|---|---|
| 3,951,273 | 4/1976 | de Caussin | 901/6 |
| 4,042,122 | 8/1977 | Espy | 414/783 |
| 4,090,287 | 3/1978 | Selander | 29/568 |
| 4,274,802 | 6/1981 | Inaba | 414/758 X |
| 4,312,110 | 1/1982 | Averyanov | 29/568 |
| 4,348,623 | 9/1982 | Kobayashi | 901/6 |
| 4,404,727 | 9/1983 | Zankl | 29/568 |

*Primary Examiner*—William R. Briggs
*Attorney, Agent, or Firm*—Benjamin Hudson, Jr.; George W. Finch; Donald L. Royer

[57] ABSTRACT

There is provided by this invention a part turnover attachment for use with an automated machine tool comprised of a chuck for supporting the tool in the rotatable spindle of the machine tool and a rotatable pickup mechanism that attaches to a workpiece. The rotatable pickup mechanism is rotated by the controlled rotation of rotatable spindle whereby the workpiece can be inverted.

2 Claims, 3 Drawing Figures

PART TURNOVER ATTACHMENT FOR AUTOMATIC MACHINE TOOL

CROSS-REFERENCE TO RELATED APPLICATIONS

This application is related to the co-pending U.S. application Ser. No. 06/681,802.

BACKGROUND OF THE INVENTION

1. Field of the Invention

This invention relates generally to attachments to automatic machine tools that have part turnover capabilities that allow additional machining to the part on its opposite side, and more particularly to part turnover attachments designed to fit into existing machine tool changers and operated by rotatable spindles on vertically disposed drill heads of the machine tool.

2. Description of the Prior Art

Automated machine tools are well-known in the art, that perform a variety of cutting functions such as milling, drilling, threading, tapping, etc. on a workpiece. These machines are normally provided with a tool carrousel that has numerous cutting tools mounted thereon for performing the variety of functions of the machine tool. The tool holder is generally a rotatable tool spindle mounted in a drill head adjustably mounted on a vertical column or quill for vertical movement thereon. The tool spindle is mounted for rotation relative to the quill and is moveable axially with respect to the drill head. Additionally, the workpiece is secured to a worktable that is moveable in an x-y horizontal plane for providing a variety of positions to perform the various cutting operations.

The machining operation is performed by the rotatable tool spindle rotatably mounted in a spindle head and arranged to be shifted vertically with respect to the workpiece. Precision cutting is performed, such that a hole center may be precisely located with respect to the axis of the rotatable tool spindle and the combined movement of the work table in its horizontal plane of movement. During the machining operation, the spindle is rotated at a pre-selected cutting speed and is fed downwardly by the drill head on the quill at a predetermined feed rate. The cutting tool is removably mounted in a chuck which is carried by the lower end of the rotatable tool spindle, and which forms a part thereof. Additionally, a tool changer is adapted to remove the used tool from the chuck at the end of a cutting operation and replace the used tool with a pre-selected new tool in an automatic manner that eliminates lost time associated with manual tool changing operations.

All of these machine functions are carried out in rapid, efficient manner in order to bring about the most efficient operation of the machine tool. The automatic control of the machine tool is provided by a numerical control system operating under the control of a punched tape or other memory device which regulates the table so as to locate a cutting center with respect to the axis of the tool, the automatic selection of the spindle speed, the spindle feed rate on the quill, and other machining functions.

Many machine parts require machining on two or more sides. Therefore, pre-programmed automatic machining cycles must be interrupted, while the part is manually turned over and repositioned. This interrupts the automatic machining cycle of the machine and requires human supervision which hinders efficiency.

It would be desirable if there were provided an automatic machine tool that had the capability to perform all machining functions in a continuous automatic cycle which includes part turnover when needed.

SUMMARY OF THE INVENTION

There is provided by this invention a part turnover attachment designed to fit in conventional automatic machine tool changers. When required, it can be transferred to the machine spindle and operated by a program rotation of the spindle. The turnover attachment has a clutch assembly and fixed stops that allows rotation of the part through 180° by the spindle rotation.

BRIEF DESCRIPTION OF THE PREFFERED EMBODIMENT

Figure 1:
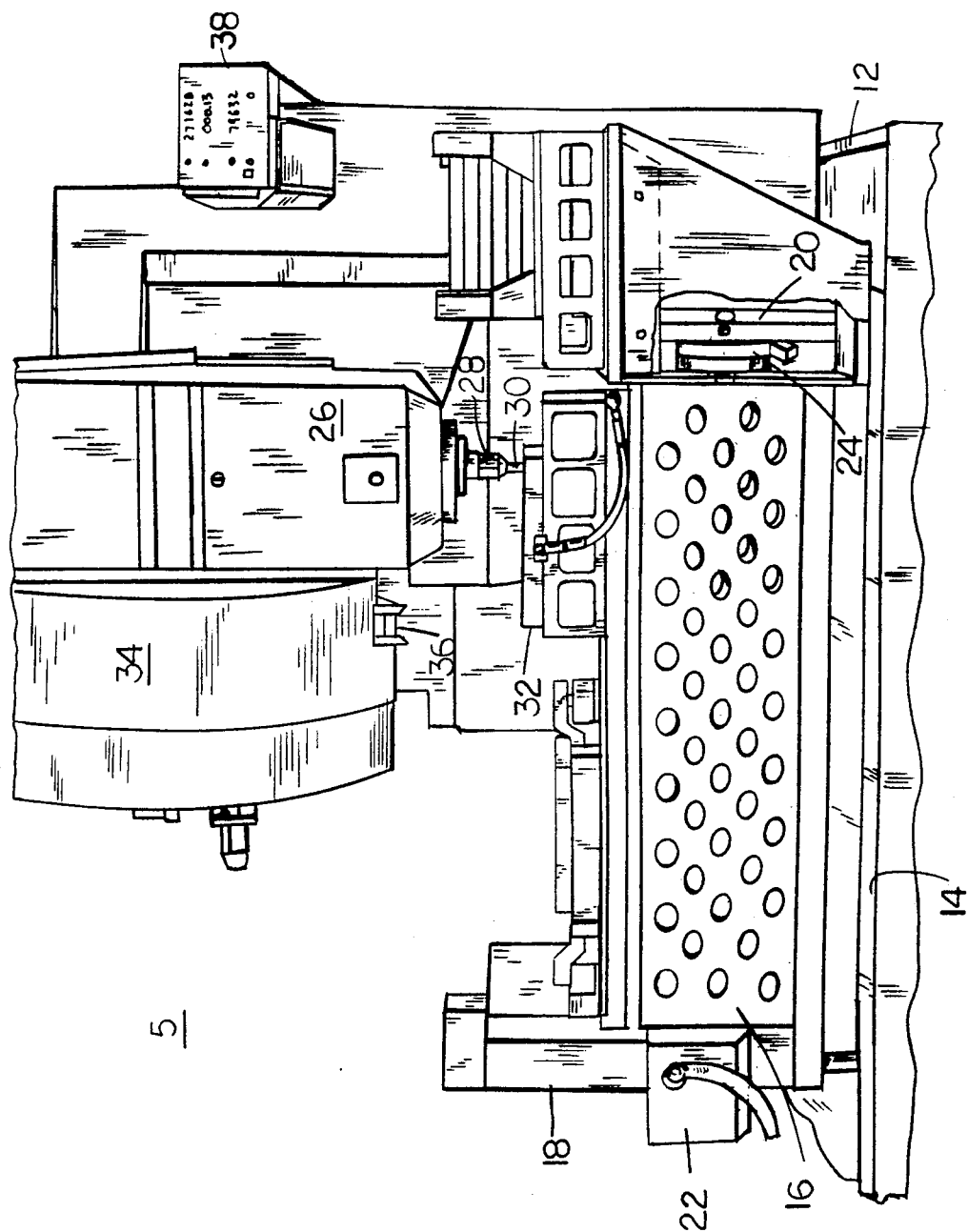
FIG. 1 is a perspective view of an automated machine tool incorporating the principles of this invention.

Referring to FIG. 1, there is shown an automated machining center 5. The automated machining center 5 is generally comprised of a frame 12 having mounted thereon a moveable bed 14 that is disposed to move longitudinally and latitudinally in a horizontal plane. Mounted on the moveable bed 14 is an elongated trunnion worktable 16 that is pivotally supported at each end by support structures 18 and 20 such that the worktable may be rotated about its horizontal axis by means of a drive motor 22. The trunnion worktable is extended to allow machining of large parts. A hydraulic brake 24 is mounted on a support 20 and actuated to apply friction braking to stop rotation of the trunnion worktable 16 at a desired position. Rotation of the trunnion worktable 16 about its horizontal axis allows precision angular cutting to be performed on a workpiece with respect to the vertical axis of a cutting tool. A workpiece 32 may be machined by rotation of the trunnion worktable 16 simultaneously with x-y movements of the table in its horizontal plane. A drive head indicated generally at 26 is mounted to the support frame 12 and is disposed to move in a vertical direction by means of a quill type shaft, not shown but well known in the art. Supported at the end of the drive head 26, is a spindle 28 that holds a machine cutting tool 30. The drive head 26 is disposed to rotate the spindle 28 and the cutting tool 30 at a fixed speed rate to cut and machine the workpiece 32 that is mounted to the worktable 16. A tool changing carrousel 34 is also supported on the support frame 12 in close proximity to the drill head 26 to store a multitude of different cutting tools that can be supported in the spindle 28 to perform different machine operations on the workpiece 32. When it is desired to change the cutting tool to perform a different machining operation, a tool changing arm 36 detaches the tool 30 from the spindle 28, returns the used tool to the tool changing carrousel 34, removes a new tool from the tool changing carrousel 34, and inserts it into the rotatable spindle 28 to perform a new machining operation.

The various automated machining functions and precise alignment of the automated machine tool 5 are controlled by a programmable control unit 38. The programmable control unit 38 may be a numerical control system with its program stored on a punch tape or other memory device. The programmable control unit 38 in addition to performing other functions that will be later described, controls the movement of the trunnion worktable 16 in a horizontal plane, the rotation of the trunnion worktable 16 about its horizontal axis, the speed rate of the rotatable spindle 28, and the automatic operation of the tool changing arm 36 to detach a used tool from the rotatable spindle 28 and exchange it with a tool stored in the tool changing carrousel 34.

Figure 2:
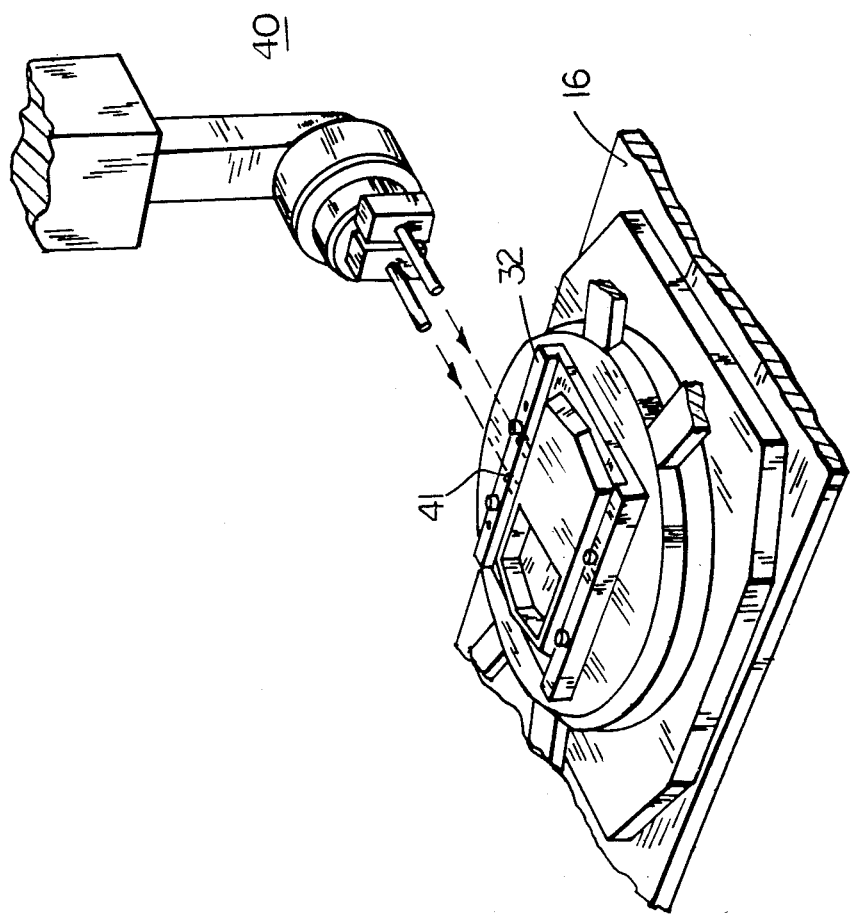
FIG. 2 is a perspective view of the part turnover attachment.

Referring to FIG. 2, when it is necessary to turn a workpiece over for additional machining, a workpiece turnover attachment 40 that is designed to be stored in the tool changing carrousel 34 is transferred to the rotatable spindle 28 and is operated by the programmed rotation of the spindle. Two nose pins are utilized by the workpiece pick-up attachment of the type hereinafter described for insertion into pre-drilled holes of the workpiece 32 to facilitate connection of the pickup attachment 40 to the workpiece 32. The workpiece turnover attachment 40 raises the workpiece from the moveable worktable 16 by means of the drive head 26, rotates the workpiece 180°, and returns the work piece to the work table for machining on the opposite side.

Figure 3:
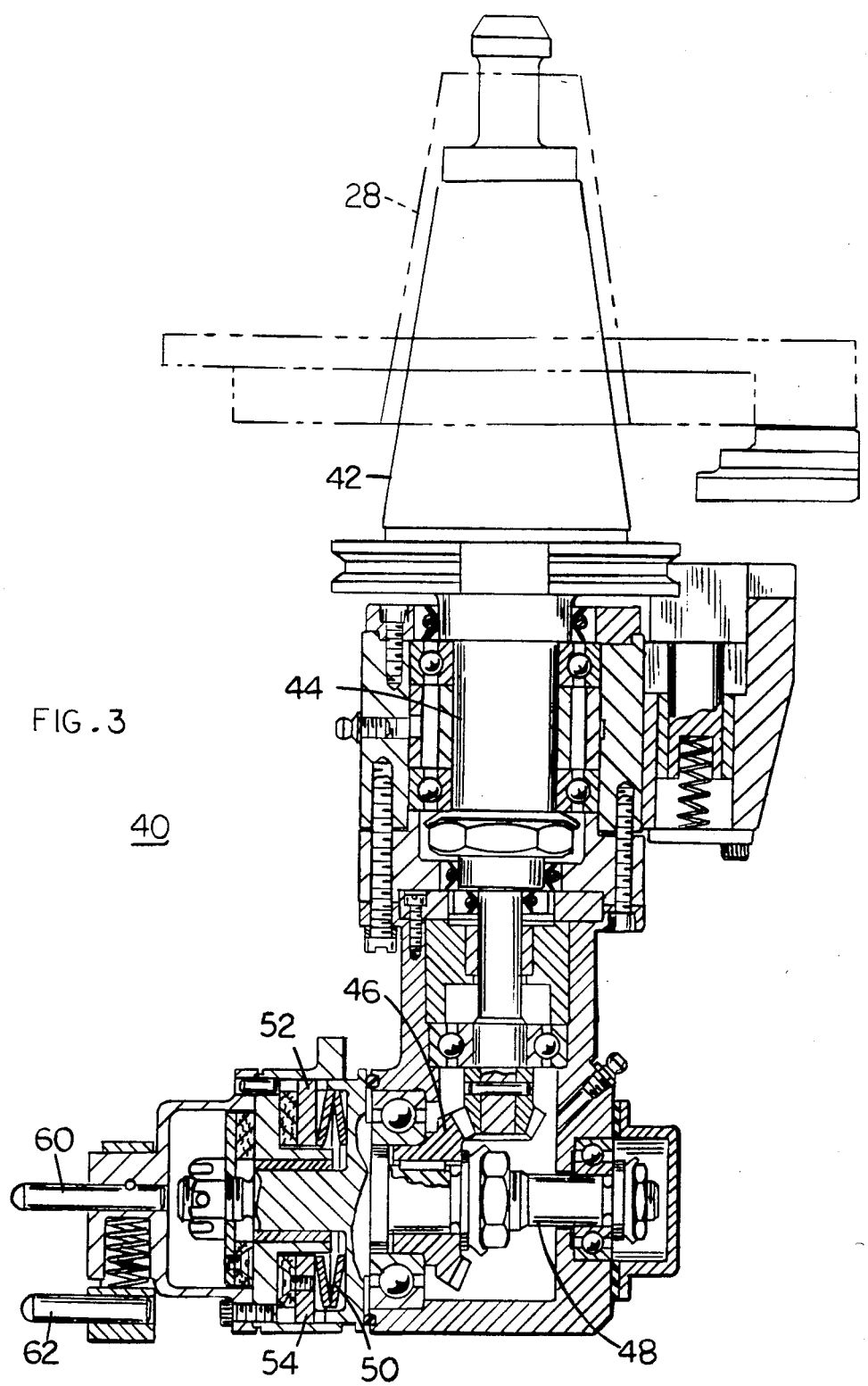
FIG. 3 is a sectional view of the part turnover attachment incorporating the principles of this invention.

Referring to FIG. 3, the work piece turnover attachment is generally comprised of a tool head 42 designed to fit into the chuck of the rotatable spindle 28. A vertical rotating shaft 44 is attached to the tool head 42 which is also connected through a right angle gear box 46 to a horizontal shaft 48. The horizontal shaft 48 has connected thereto a clutch assembly 50 and control stops 52 and 54 that limit rotation through 180°. Attached to the horizontal shaft are two ball-nose pins 60 and 62, one of which is fixed, while the other is mounted on slides and is spring loaded. Both pins 60 and 62 are designed to enter pre-drilled holes in the side of the workpiece, the spring loaded pin 62 exerting a force thus holding the part firmly. Once the pins have been inserted into the workpiece, the rotatable spindle is then raised vertically and the spindle is rotated 180° utilizing the clutch assembly 50 and stops 52 and 54 to turn the workpiece over. The workpiece is then lowered to the moveable work table 16 by the drive head 26.

Although there has been illustrated and described specific detail and structure of operation, it is clearly understood that the same were merely for purposes of illustration and that changes and modifications may be readily made therein by those skilled in the art without departing from the spirit and scope of this invention.

What we claim is:

1. A part turnover attachment for an automatic machine tool, comprising:
    (a) A frame;
    (b) A movable worktable means connected to the frame for supporting a workpiece and movable longitudinally and latitudinally to position the workpiece at a desired point in a horizontal plane;
    (c) A rotatable spindle means connected to the frame in a disposition of vertical movement thereon for supporting and rotating a cutting tool at a predetermined speed rate to machine the workpiece;
    (d) A tool changing means connected to the frame for storing cutting tools and exchanging the cutting tool supported in the rotatable spindle means with one of a multitude of different cutting tools stored therein;
    (e) A part turnover attachment disposed to be stored in the tool changing means and supported by the rotatable spindle means for removing the workpiece from the movable worktable, turning the workpiece over, and returning the workpiece to the movable worktable;
    (f) A programmable control means disposed to control the movable worktable means, the rotatable spindle means, the tool changing means, and the part turnover attachment for automatically turning the workpiece over on the movable worktable for machining on its opposite side.

2. A part turnover attachment as recited in claim 1 wherein the the part turnover attachment is generally comprised of:
    (a) tool head disposed to be supported and rotated by the rotatable spindle means;
    (b) a first drive shaft connected to the tool head;
    (c) a right angle gearing means connected to the first drive shaft;
    (d) a second drive shaft connected to the right angle gearing means such that the second drive shaft is generally perpendicular to the first drive shaft and is caused to rotate by the rotation of the first drive shaft via the right angle gearing means;
    (e) a gripping means connected to the second drive shaft means for gripping the work piece and supporting it thereon; and
    (f) a clutch and stop means for releasing the gripping means from the second drive shaft and stopping rotation after 180°.

* * * * *